(12) United States Patent
Kuroiwa et al.

(10) Patent No.: US 8,316,395 B2
(45) Date of Patent: Nov. 20, 2012

(54) INFORMATION PROCESSING APPARATUS AND METHOD, AND PROGRAM

(75) Inventors: Tatsuo Kuroiwa, Tokyo (JP);
Masachika Sasaki, Kanagawa (JP);
Satoshi Fujimura, Kanagawa (JP);
Hisashi Hosaka, Tokyo (JP)

(73) Assignee: Sony Corporation, Tokyo (JP)

( * ) Notice: Subject to any disclaimer, the term of this patent is extended or adjusted under 35 U.S.C. 154(b) by 732 days.

(21) Appl. No.: 11/969,468

(22) Filed: Jan. 4, 2008

(65) Prior Publication Data
US 2008/0168499 A1    Jul. 10, 2008

(30) Foreign Application Priority Data
Jan. 5, 2007    (JP) ................................. 2007-000345

(51) Int. Cl.
*H04N 5/445* (2006.01)
(52) U.S. Cl. .......................................... 725/45; 725/151
(58) Field of Classification Search .................... None
See application file for complete search history.

(56) References Cited

U.S. PATENT DOCUMENTS

| | | | |
|---|---|---|---|
| 6,005,565 A * | 12/1999 | Legall et al. ................... | 715/721 |
| 6,256,631 B1 * | 7/2001 | Malcolm .............................. | 1/1 |
| 6,665,870 B1 * | 12/2003 | Finseth et al. ................... | 725/40 |
| 2002/0042920 A1 * | 4/2002 | Thomas et al. .................. | 725/87 |
| 2003/0163815 A1 * | 8/2003 | Begeja et al. .................... | 725/46 |
| 2005/0015815 A1 * | 1/2005 | Shoff et al. ..................... | 725/135 |
| 2005/0240964 A1 * | 10/2005 | Barrett ............................. | 725/44 |
| 2006/0230021 A1 * | 10/2006 | Diab et al. ........................ | 707/3 |
| 2006/0277167 A1 * | 12/2006 | Gross et al. ........................ | 707/3 |
| 2007/0073704 A1 * | 3/2007 | Bowden et al. .................. | 707/10 |

FOREIGN PATENT DOCUMENTS

| | | |
|---|---|---|
| JP | 2004-23345 | 1/2004 |
| JP | 2005-4663 | 1/2005 |
| JP | 2006-246064 | 9/2006 |
| WO | WO 2006/123744 A1 | 11/2006 |

* cited by examiner

*Primary Examiner* — Jason Salce
*Assistant Examiner* — Chenea Smith
(74) *Attorney, Agent, or Firm* — Oblon, Spivak, McClelland, Maier & Neustadt, L.L.P.

(57) ABSTRACT

An information processing apparatus includes a content metadata obtaining unit configured to obtain content metadata; a determination unit configured to determine the category of the content metadata; an editing unit configured to edit the content metadata so that, when text data of the content metadata is to be reproduced on the basis of the category of the content metadata determined by the determination unit, information on a predetermined link destination is displayed in response to a predetermined operation being performed on the reproduced text data; a reproduction unit configured to reproduce the text data of the content metadata in synchronization with the reproduction of the content; and a display unit configured to display the information on the link destination on the basis of the content metadata edited by the editing unit when the predetermined operation is performed on the text data of the content metadata reproduced by the reproduction unit.

9 Claims, 13 Drawing Sheets

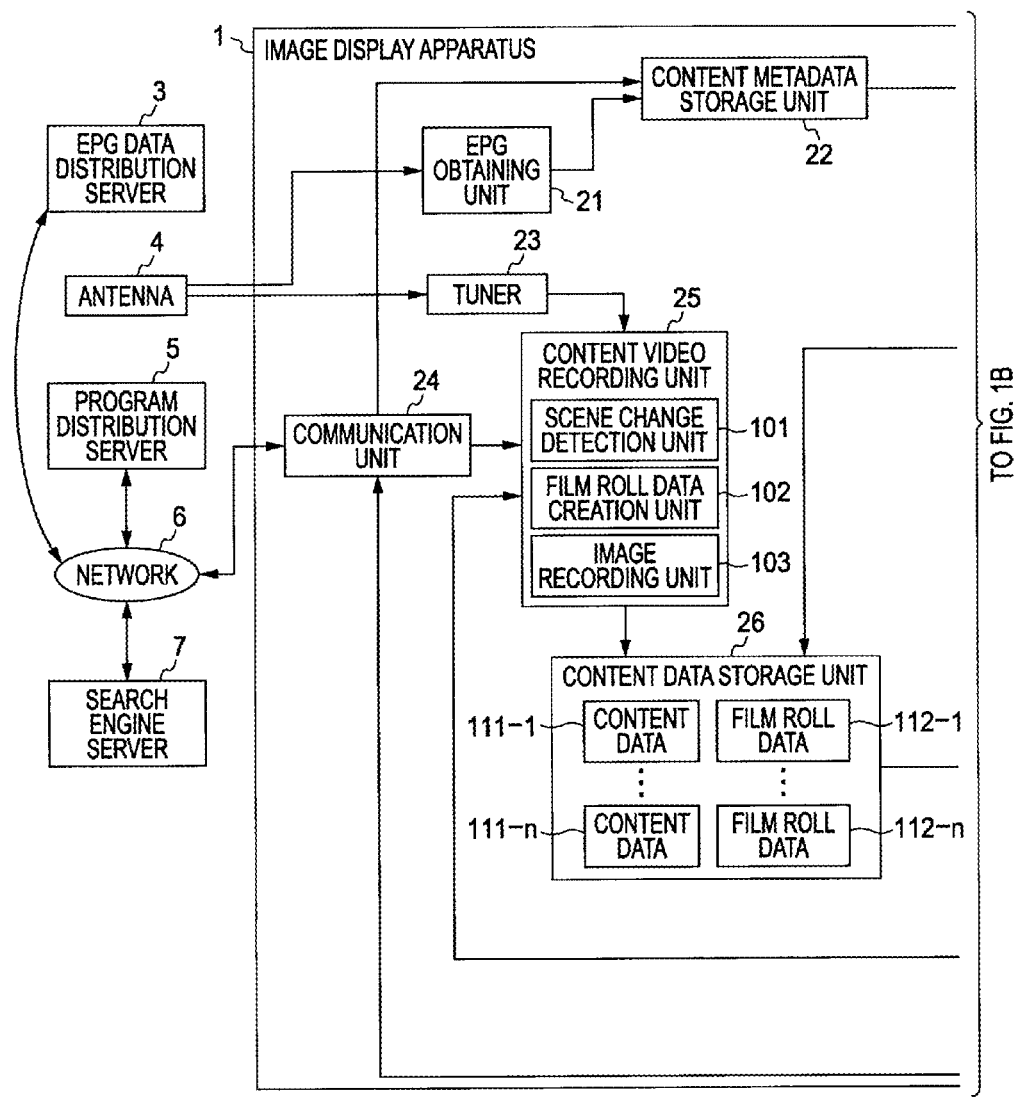

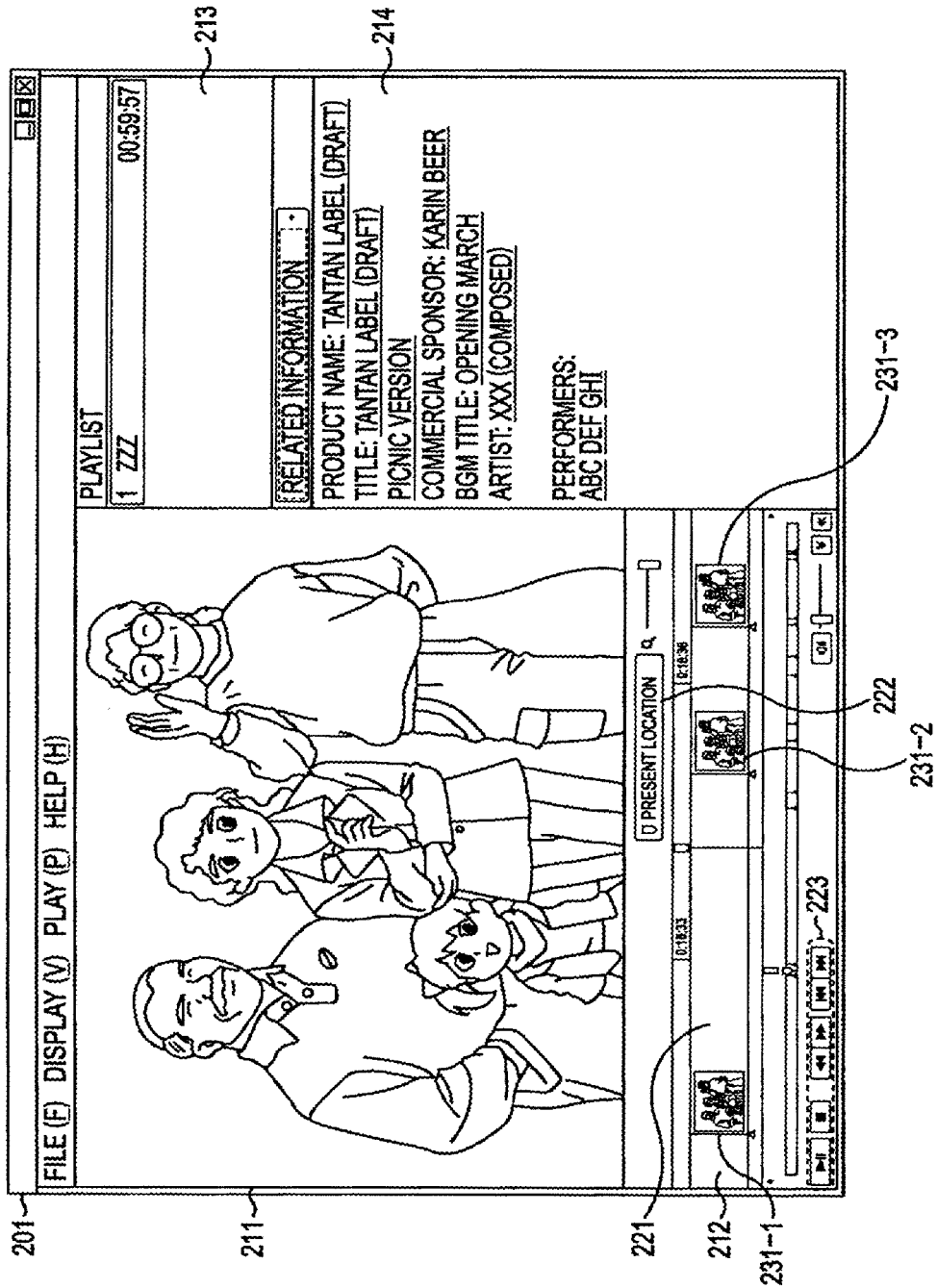

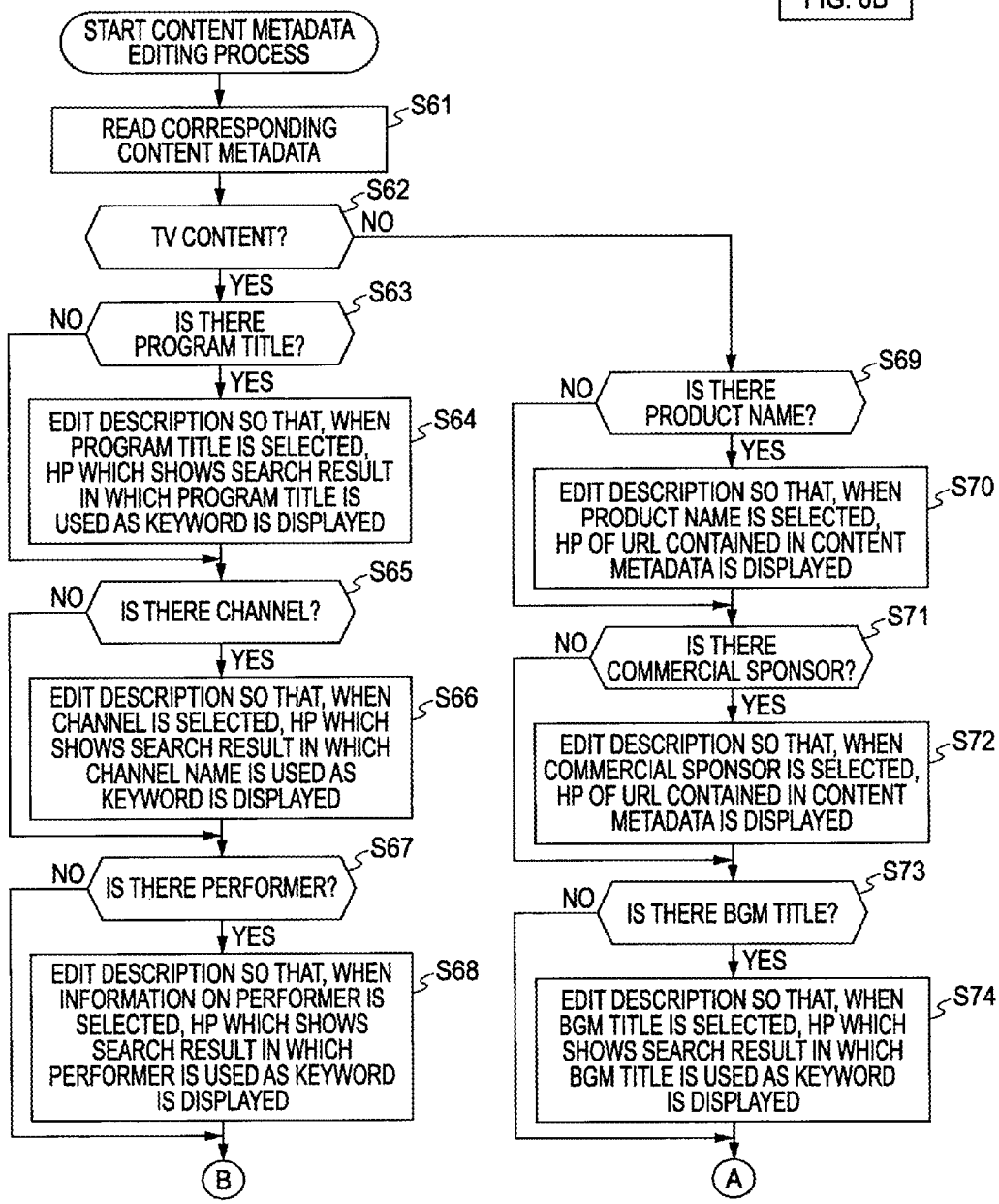

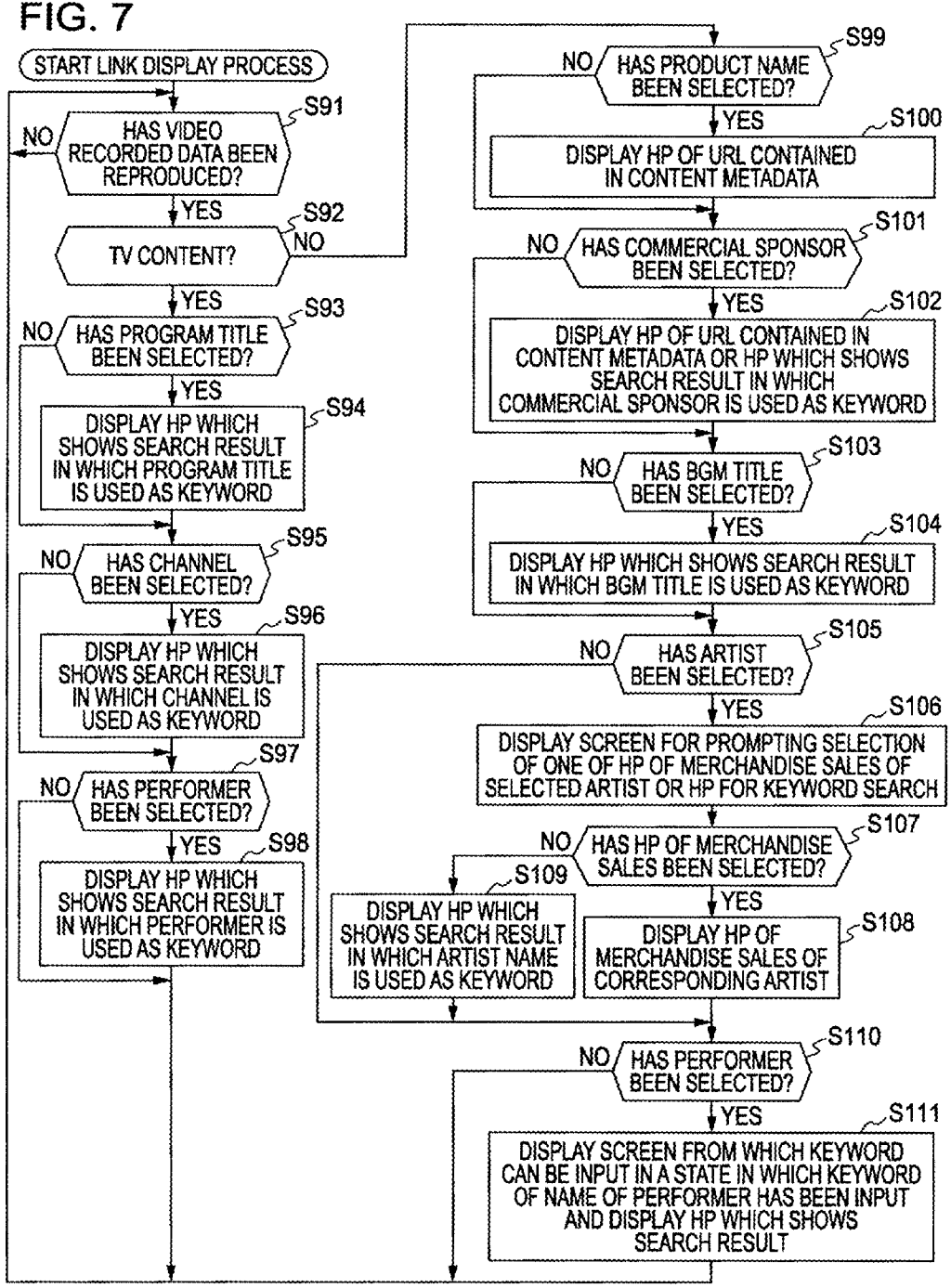

FIG. 8

| RELATED INFORMATION ▼ |

TITLE: AAA

CHANNEL: XCH BBB TELEVISION

VIDEO RECORDING
DATE AND TIME: 21:00 – 22:09  4/17/2006 (Mon.)
            (1 HOUR 9 MINUTES)

GENRE: VARIETY SHOW/OTHERS

PERFORMERS, etc.:

CCC DDD EEE

FIG. 9

RELATED INFORMATION ▼

PRODUCT NAME: LIFEGUARD
TITLE: LIFEGUARD "FINANCIAL CONGLOMERATE VERSION"
COMMERCIAL SPONSOR: LIFEGUARD
BGM TITLE: AAAA
ARTIST: BBBB
PERFORMERS, etc.:
CCCC DDDD EEEE

INFORMATION PROCESSING APPARATUS AND METHOD, AND PROGRAM

CROSS REFERENCES TO RELATED APPLICATIONS

The present invention contains subject matter related to Japanese Patent Application JP 2007-000345 filed in the Japanese Patent Office on Jan. 5, 2007, the entire contents of which are incorporated herein by reference.

BACKGROUND OF THE INVENTION

1. Field of the Invention

The present invention relates to an information processing apparatus and method, and a program. More particularly, the present invention relates to an information processing apparatus and method capable of displaying related information in such a manner as to change the related information on the basis of the category of metadata of content and, to a program.

2. Description of the Related Art

Technologies for receiving and displaying content metadata, such as an EPG (Electronic Program Guide), have become widely popular.

An EPG is distributed at predetermined time intervals in a state in which it is contained in a broadcast wave, is received by a television receiver or the like, and is displayed as an electronic program guide separately from display of a program.

In recent years, a technology has been proposed in which text information contained in an EPG is displayed, and also a search process is performed by a search engine via the Internet by using the text information as a keyword and a search result is displayed (see Japanese Unexamined Patent Application Publication No. 2004-23345).

SUMMARY OF THE INVENTION

However, in the case of a search using text information contained in an EPG as a keyword, although related information can be displayed, an object desired to be searched for differs depending on the category of EPG. That is, in the case of, for example, persons' names contained in the category of performers among items represented by the EPG, in order to find information on individual performers, such information may be satisfactorily obtained by performing a search using the performer's name as a keyword as in the known case.

However, when it is desired to purchase CDs (Compact Discs), DVDs (Digital Versatile Discs), and the like, using a BGM title or an artist name, it is not possible to directly purchase such a CD or DVD having the BGM title or the artist name on the basis of the information obtained by searching by using the BGM title and the artist name as keywords.

If a user is to purchase such a product, the user needs to access a sales site of CDs and DVDs and needs to search the sales site by using the BGM title and the artist name in a similar manner again, which is a troublesome process.

The present invention has been made in view of such circumstances. In particular, it is desirable to obtain desired information by changing an item to be searched for in correspondence with the category of content metadata, such as an EPG, and by only clicking on the content metadata.

According to an embodiment of the present invention, there is provided an information processing apparatus including: content metadata obtaining means for obtaining content metadata; determination means for determining the category of the content metadata; editing means for editing the content metadata so that, when text data of the content metadata is to be reproduced on the basis of the category of the content metadata determined by the determination means, information on a predetermined link destination is displayed in response to a predetermined operation being performed on the reproduced text data; reproduction means for reproducing the text data of the content metadata in synchronization with the reproduction of the content; and display means for displaying the information on the link destination on the basis of the content metadata edited by the editing means when the predetermined operation is performed on the text data of the content metadata that is reproduced by the reproduction means.

In response to the predetermined operation being performed, the editing means may access a search engine on the basis of the category of content metadata determined by the determination means, and may edit the content metadata so that a homepage that shows a search result of the text data of the content metadata is displayed.

The editing means may access a sales site of a commodity related to the text data in response to the predetermined operation being performed on the basis of the category of content metadata determined by the determination means, and may edit the content metadata so that the sales site is displayed.

The editing means may display a screen for inputting text data to be searched for by a search engine in a state in which the text data has been input in advance in response to the predetermined operation being performed on the basis of the category of content metadata determined by the determination means, may access the search engine after the input of the text data is completed, and may edit the content metadata so that a homepage that shows a search result of the text data is displayed.

When the text data is a predetermined address or contains a predetermined address, the editing means may access a server of the predetermined address in response to the predetermined operation being performed on the basis of the category of content metadata determined by the determination means, and may edit the content metadata so that a homepage that exists at the predetermined address is displayed.

When the text data is a predetermined address or contains the predetermined address, in response to the predetermined operation being performed on the basis of the category of content metadata determined by the determination means, the editing means may display a selection screen for selecting either accessing a server indicated by the address and displaying a homepage of the address or accessing a search engine and displaying a homepage that shows a search result of the text data of the content metadata, and may edit the content metadata so that a homepage of the selected content is displayed.

According to another embodiment of the present invention, there is provided an information processing method including the steps of: obtaining content metadata; determining the category of the content metadata; editing the content metadata so that, when text data of the content metadata is to be reproduced on the basis of the category of the content metadata determined in the determination, information on a predetermined link destination is displayed in response to a predetermined operation being performed on the reproduced text data; reproducing the text data of the content metadata in synchronization with the reproduction of the content; and displaying the information on the link destination on the basis of the content metadata edited in the editing when the predetermined operation is performed on the text data of the content metadata that is reproduced in the reproduction.

According to another embodiment of the present invention, there is provided a program for enabling a computer to execute a method including the steps of: obtaining content metadata; determining the category of the content metadata; editing the content metadata so that, when text data of the content metadata is to be reproduced on the basis of the category of the content metadata determined in the determination, information on a predetermined link destination is displayed in response to a predetermined operation being performed on the reproduced text data; reproducing the text data of the content metadata in synchronization with the reproduction of the content; and displaying the information on the link destination on the basis of the content metadata edited in the editing when the predetermined operation is performed on the text data of the content metadata that is reproduced in the reproduction.

The computer program according to an embodiment of the present invention is stored on the program storage medium according to an embodiment of the present invention.

In the information processing apparatus and method, and the computer program according to embodiments of the present invention, when obtaining content metadata, determining the category of content metadata, and reproducing the text data of the content metadata on the basis of the determined category of the content metadata, in the case that the content metadata is edited so that information on a predetermined link destination is displayed in response to a predetermined operation being performed on the reproduced text data, the text data of the content metadata is reproduced in synchronization with the reproduction of the content, and when the predetermined operation is performed on the reproduced text data of the content metadata, the information on the link destination is displayed on the basis of the edited content.

The information processing apparatus according to an embodiment of the present invention may be an independent apparatus and may also be a block for performing information processing.

According to the embodiment of the present invention, it is possible to display related information in such a manner as to change the related information on the basis of the category of the metadata of content.

BRIEF DESCRIPTION OF THE DRAWINGS

FIG. 5 illustrates an example of a window displayed by the content reproduction process;

FIG. 7 is a flowchart illustrating a link display process;

FIG. 8 illustrates an example of a display of a related information display part;

FIG. 9 illustrates an example of a display of a related information display part;

DESCRIPTION OF THE PREFERRED EMBODIMENTS

Figure 1B:
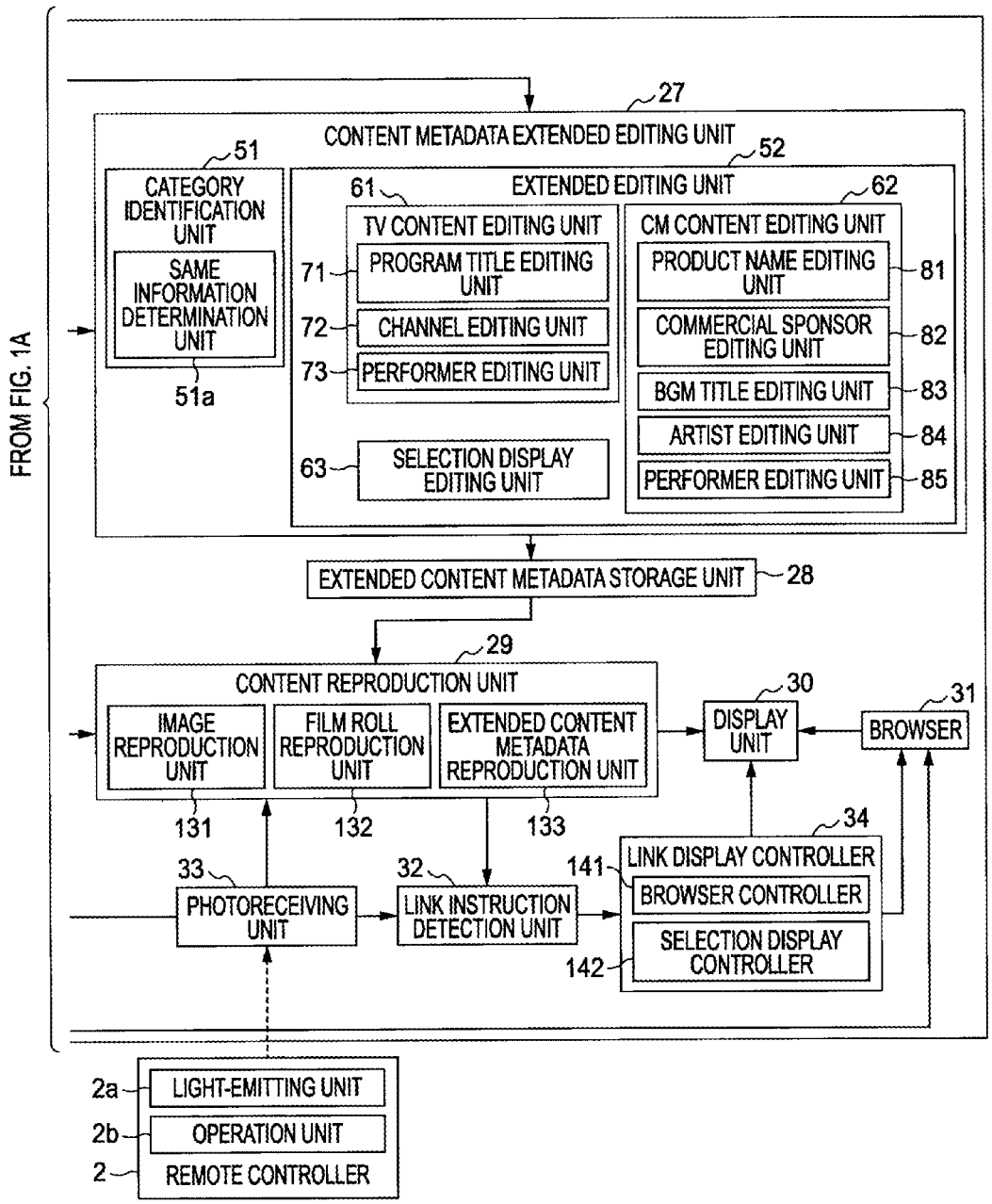
FIG. 1 is a block diagram showing an example of the configuration of an embodiment of an image display apparatus to which the present invention is applied.

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the embodiments of the invention disclosed in the embodiment are described in the claims. That is, the description does not deny the existence of embodiments of the present invention that are described in the embodiment but not claimed in the invention of this application, i.e., the existence of embodiments of the present invention that in future may be claimed by a divisional application, or that may be additionally claimed through amendments.

An information processing apparatus according to an embodiment of the present invention includes: content metadata obtaining means (e.g., an EPG obtaining unit 21 shown in FIG. 1) for obtaining content metadata; determination means (e.g., a category identification unit 51 shown in FIG. 1) for determining the category of the content metadata; editing means (e.g., an extended editing unit 52 shown in FIG. 1) for editing the content metadata so that, when text data of the content metadata is to be reproduced on the basis of the category of the content metadata determined by the determination means, information on a predetermined link destination is displayed in response to a predetermined operation being performed on the reproduced text data; reproduction means (e.g., a content reproduction unit 29 shown in FIG. 1) for reproducing the text data of the content metadata in synchronization with the reproduction of the content; and display means (e.g., a display unit 30 shown in FIG. 1) for displaying the information on the link destination on the basis of the content metadata edited by the editing means when the predetermined operation is performed on the text data of the content metadata that is reproduced by the reproduction means.

The editing means (e.g., an extended editing unit 52 shown in FIG. 1) may access a search engine in response to the predetermined operation being performed on the basis of the category of content metadata determined by the determination means, and may edit the content metadata so that a homepage that shows a search result of the text data of the content metadata is displayed.

The editing means (e.g., an extended editing unit 52 shown in FIG. 1) may access a sales site of a merchandise related to the text data in response to the predetermined operation being performed on the basis of the category of content metadata determined by the determination means, and may edit the content metadata so that the sales site is displayed.

The editing means (e.g., an extended editing unit 52 shown in FIG. 1) may display a screen for inputting text data to be searched for by a search engine in a state in which the text data has been input in advance in response to the predetermined operation being performed on the basis of the category of content metadata determined by the determination means, may access the search engine after the input of the text data is completed, and may edit the content metadata so that a homepage that shows a search result of the text data is displayed.

When the text data is a predetermined address or contains a predetermined address, the editing means (e.g., an extended editing unit 52 shown in FIG. 1) may access a server of the predetermined address in response to the predetermined operation being performed on the basis of the category of content metadata determined by the determination means, and may edit the content metadata so that a homepage that exists at the predetermined address is displayed.

When the text data is a predetermined address or contains the predetermined address, in response to the predetermined operation being performed on the basis of the category of content metadata determined by the determination means, the editing means (e.g., an extended editing unit 52 shown in FIG. 1) may display a selection screen for selecting either accessing a server indicated by the address and displaying a homepage of the address or accessing a search engine and displaying a homepage that shows a search result of the text data of the content metadata, and may edit the content metadata so that a homepage of the selected content is displayed.

Figure 3:
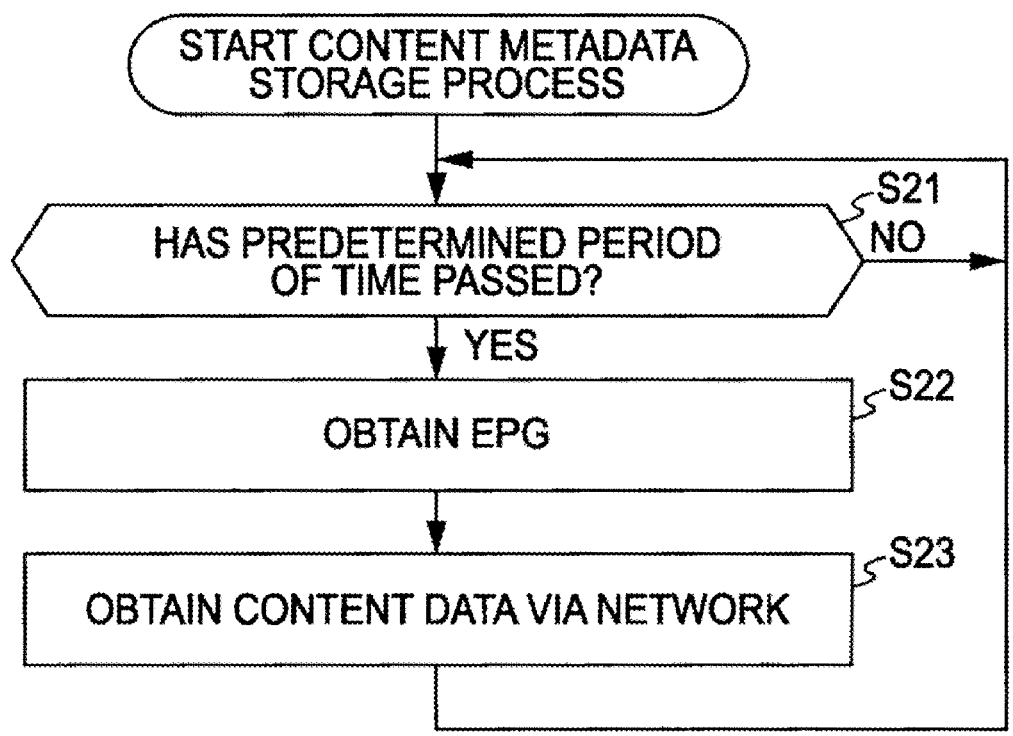
FIG. 3 is a flowchart illustrating a content metadata storage process.

An information processing method according to another embodiment of the present invention includes the steps of: obtaining (e.g., step S22 shown in FIG. 3) content metadata; determining (e.g., step S63, S65, S67, S69, S71, S73, S75, or S77 shown in FIG. 3) the category of the content metadata; editing (e.g., step S64, S66, S68, S70, S72, S74, S76, S78, or S80 shown in FIG. 3) content metadata so that, when text data of the content metadata is to be reproduced on the basis of the category of the content metadata determined in the determination, information on a predetermined link destination is displayed in response to a predetermined operation being performed on the reproduced text data; reproducing (e.g., step S42 shown in FIG. 4) the text data of the content metadata in synchronization with the reproduction of the content; and displaying (e.g., step S94, S96, S98, S100, S102, S104, S106, S108, S109, or S111 shown in FIG. 7) the information on the link destination on the basis of the content metadata edited in the editing when the predetermined operation is performed on the text data of the content metadata that is reproduced in the reproduction.

FIG. 1 shows an example of the configuration of an embodiment of an image display apparatus to which the present invention is applied.

An image display apparatus 1 is, for example, a television receiver. The image display apparatus 1 is operated using a remote controller 2, and receives and displays content distributed in the form of a broadcast wave from a broadcast station by using an antenna 4 and also, records the content. Furthermore, the image display apparatus 1 obtains and displays content distributed by a program distribution server 5 via a network 6 typified by the Internet and also, records the content, or reproduces and displays the content.

In addition, the image display apparatus 1 obtains, as content metadata, not only EPG data contained in the broadcast wave, but also EPG data distributed from an EPG data distribution server 3 via the network 6. Furthermore, the image display apparatus 1 edits and displays content metadata, such as the obtained EPG, in an extended manner and also, performs a corresponding process when the displayed content metadata is selected from the remote controller 2 or the like, so that, for example, access is made to a search engine server 7 via the network 6, and the related information of the selected content metadata is obtained and displayed.

An EPG obtaining unit 21 obtains an EPG which is contained in a broadcast wave from a broadcast station (not shown) and which is distributed from the antenna 4, and allows a content metadata storage unit 22 to store the EPG as content metadata. Furthermore, the EPG obtaining unit 21 controls a communication unit 24 formed by a modem and the like in order to access the EPG data distribution server 3 via the network 6, obtains EPG data, and allows the content metadata storage unit 22 to store the EPG data as content metadata. The content metadata is text data in which information on content is described. For example, when content is a TV (television) program, the content metadata is the title of a program, video recording date and time, broadcast time, a channel (the channel is a broadcast station in the case of a broadcast wave, and is the distribution source company in the case of network distribution) of the program, a genre, a subgenre, performers, or the like. When content is a CM (commercial message), the content metadata includes a product name, a title, a commercial sponsor, a BGM title, an artist, performers, or the like.

A content video recorder 25 is controlled using the remote controller 2, sets a tuner 23 to a predetermined channel, receives content distributed from a broadcast station (not shown) and distributed as a broadcast wave via the antenna 4, and allows a content data storage unit 26 formed by, for example, an HDD (Hard Disk Drive) or the like to store the content as content data 111. Furthermore, the content video recorder 25 controls the communication unit 24, and allows the content data storage unit 26 to store content distributed by the program distribution server 5 via the network 6 as the content data 111.

When the content video recorder 25 records content, the content video recorder 25 controls a scene change detector 101 in order to detect the timing at which a scene changes in units of frames, and supplies a detection result to a film roll data creation unit 102. The film roll data creation unit 102 records the information on the frame numbers in the content data corresponding to the timing of the scene change in film roll data 112, and stores the film roll data 112 in the content data storage unit 26 in such a manner as to correspond to the content data 111. An image video recorder 103 allows the content data storage unit 26 to store, as content data, the information obtained as content by the content video recorder 25.

Therefore, in the content data storage unit 26, content data 111-1 to 111-*n* is stored, and film roll data 112-1 to 112-*n* is stored in a corresponding manner. Details of the film roll data 112 will be described later. When the content data 111-1 to 111-*n* and the film roll data 112-1 to 112-*n* do not need to be distinguished from each other, these will be referred to simply as content data 111 and film roll data 112, respectively, and the other data will be referred to in a similar manner.

Figure 4:
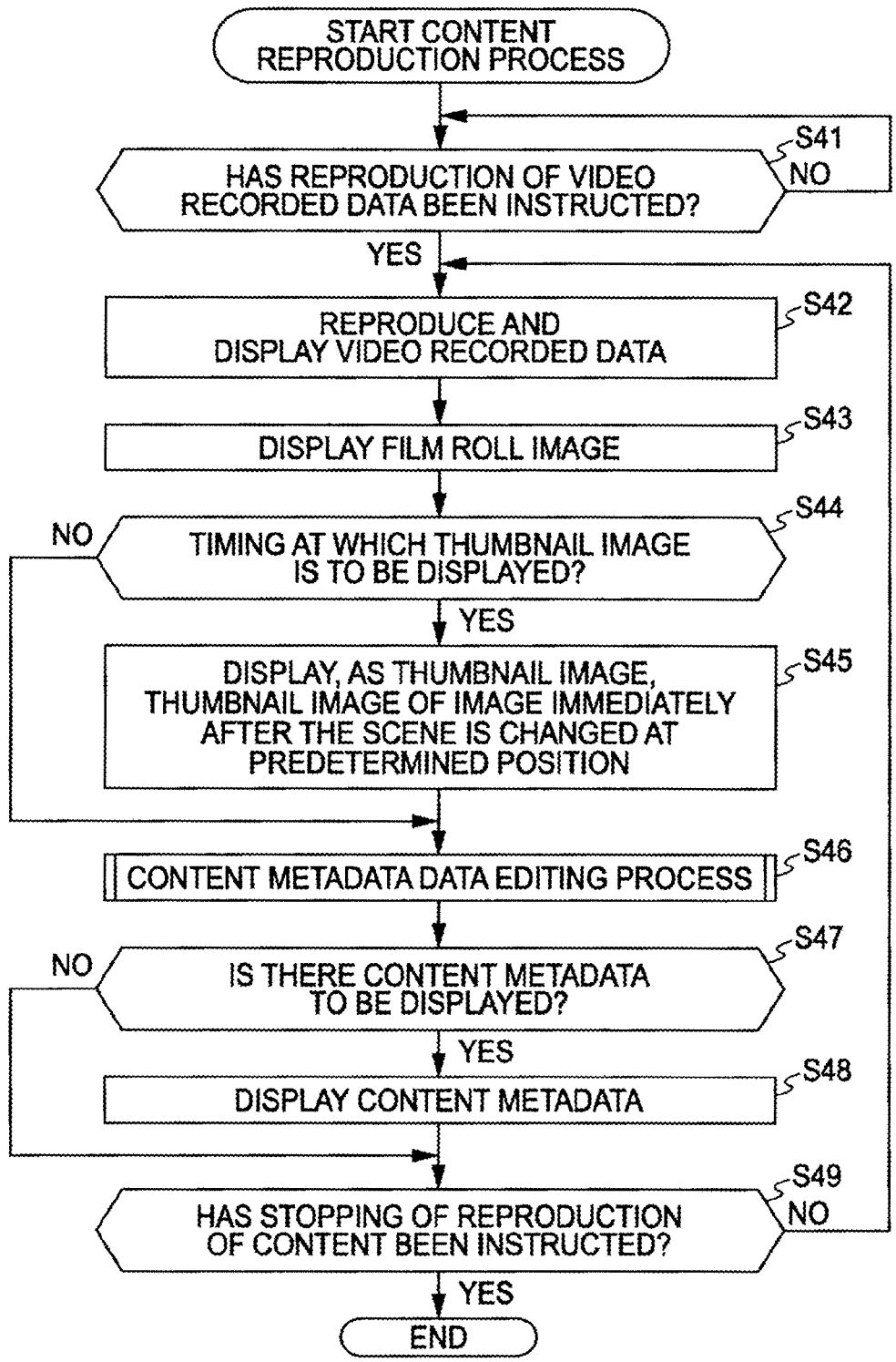
FIG. 4 is a flowchart illustrating a content reproduction process.

When the reproduction of one of the pieces of the content data 111 in the content data storage unit 26 is started, a content metadata extended editing unit 27 reads the corresponding content metadata (EPG data) from the content metadata storage unit 22, extends and edits the content metadata, and stores the content metadata in an extended content metadata storage unit 28. More specifically, in addition to being represented as text data, the content metadata extended editing unit 27 extends content metadata formed of text data and edits it to form data to which usable functions are attached by using a language such as XML (Extensible Markup Language). Then, the edited data is used and displayed as a related information display part 214 (to be described later), as shown in FIGS. 4, 8, and 9.

A category identification unit 51 of the content metadata extended editing unit 27 identifies a category for each of the described content of the original content metadata read from the content metadata storage unit 22, and supplies the identification result to an extended editing unit 52. Furthermore, when a category is to be identified, a same information determination unit 51a determines whether or not, for example, a plurality of pieces of the same information exist, that is, determines whether or not the same URL (Uniform Resource Locator) is contained although text data differs in the categories of product names and commercial sponsors in CM (commercial message) content, and supplies the determination result to a commercial sponsor editing unit 82.

A TV (television program) content editing unit 61 of the extended editing unit 52 extends and edits the content metadata of the TV content among the content metadata.

When the text data of the content metadata belonging to the category of program titles among the content metadata of the TV content is displayed and further selected, a program title editing unit 71 of the TV content editing unit 61 allows the search engine server 7 to perform a search by using the text data as a keyword, and extends and edits the content metadata so that an HP (homepage) that shows the search result is displayed.

When the text data of the content metadata belonging to the category of channel names among the content metadata of the TV content is displayed and further selected, a channel editing unit 72 of the TV content editing unit 61 allows the search engine server 7 to search for the content metadata by using the text data as a keyword, and extends and edits the content metadata so that an HP that shows the search result is displayed.

When the text data of the content metadata belonging to the category of performer names among the content metadata of the TV content is displayed and further selected, a performer editing unit 73 of the TV content editing unit 61 allows the search engine server 7 to search for the content metadata by using the text data as a keyword, and extends and edits the content metadata so that an HP that shows the search result is displayed.

The CM content editing unit 62 of the extended editing unit 52 extends and edits the content metadata of the CM content among the content metadata.

When the text data of the content metadata belonging to the category of product names among the content metadata of the CM content is displayed and selected, a product name editing unit 81 of the CM content editing unit 62 extends and edits the content metadata so that an HP of the address specified by the URL, at which the description of product names and the like are provided, is displayed. In this example, content metadata belonging to the category of product names is assumed to be a URL. However, the content metadata is not limited to a URL, and may be information other than that.

When the text data of the content metadata belonging to the category of commercial sponsors among the content metadata of CM content is displayed and selected, a commercial sponsor editing unit 82 of the CM content editing unit 62 extends and edits the content metadata so that the HP of the address specified by the URL at which the description of the commercial sponsor, and the like are provided, is displayed. Here, the content metadata belonging to the category of commercial sponsors is assumed to be a URL. However, the content metadata is not limited to a URL and may be information other than that.

However, when the following fact is notified by the same information determination unit 51a that, regarding the information corresponding to the category of product names and commercial sponsors, not only the text data but also the URL contained is the same, in the case that the text data of the content metadata belonging to the category of commercial sponsors among the content metadata of the CM content is displayed and selected, the commercial sponsor editing unit 82 allows the search engine server 7 to search for the content metadata by using the text data as a keyword, extends and edits the content metadata so that an HP that shows the search result is displayed and information differing from that when the text data of the category of product names is displayed and selected is provided. This is only for the purpose of avoiding the case that the same information is provided in spite of the fact that different information has been selected. When the text data of the content metadata belonging to the category of product names among the content metadata is displayed and selected by the product name editing unit 81 in place of the commercial sponsor editing unit 82, the search engine server 7 is made to search for the content metadata by using the text data as a keyword, and the content metadata is extended and edited so that an HP that shows the search result is displayed.

When the text data of the content metadata belonging to the category of BGM titles among the content metadata of the CM content is displayed and selected, a BGM title editing unit 83 of the CM content editing unit 62 allows the search engine server 7 to perform a search by using the text data as a keyword, and extends and edits content metadata so that an HP that shows the search result is displayed.

When the text data of the content metadata belonging to the category of artist names among the content metadata of the CM content is displayed and selected, an artist editing unit 84 of the CM content editing unit 62 displays a screen from which a selection can be made as to displaying an HP of a merchandise sales site (sales site) at which CDs, DVDs, and the like of the artist are sold or allowing the search engine server 7 to perform a search by using the text data as a keyword and displaying an HP that shows the search result, and further extends and edits content metadata so that the selected HP is displayed. At this time, the selection display editing unit 63 generates information for displaying a selection screen used here as content metadata to be extended.

When the text data of the content metadata belonging to the category of performers among the content metadata of the CM content is displayed and selected, a performer editing unit 85 of the CM content editing unit 62 allows the search engine server 7 to perform a search by using the text data as a keyword, and extends and edits content metadata so that an HP that shows the search result is displayed.

When predetermined video-recorded data is selected by the operation unit 2b of the remote controller 2 being operated, and a light-emission signal indicating that reproduction has been instructed from the light-emitting unit 2a is received by a light-receiving unit 33, a content reproduction unit 29 controls an image reproduction unit 131 in order to read and reproduce the corresponding content data 111 from the content data storage unit 26, and allows a display unit 30 formed of a CRT (Cathode Ray Tube), an LCD (Liquid Crystal Display), or the like to display the content data. Furthermore, the content reproduction unit 29 controls a film roll reproduction unit 132 in order to read the film roll data 112 corresponding to the content data 111, and displays, on the display unit 30, a thumbnail image of the image immediately after the scene is changed, which corresponds to a time code recorded in the film roll data 112 in the manner of a film roll in synchronization with the timing at which the content data 111 is sequentially reproduced by the image reproduction unit 131.

An extended content metadata reproduction unit 133 reads extended content metadata from the extended content metadata storage unit 28, and displays the extended content metadata on the display unit 30 in synchronization with the reproduced content data 111.

On the basis of a signal such that a light-emission signal supplied from the remote controller 2 is received by a light-receiving unit 33, a link instruction detector 32 detects whether or not one of the pieces of text displayed as content metadata has been clicked on, and supplies information on the extended content metadata corresponding to the detection result to a link display controller 34.

On the basis of the extended content metadata supplied from the link instruction detector 32, the link display controller 34 controls a browser controller 141 in order to operate the browser 31. The browser 31 is controlled by the browser controller 141, controls the communication unit 24 as necessary, accesses the search engine server 7 via the network 6 in order to perform a search process by using a keyword, and allows the display unit 30 to display an HP that shows the search result. Furthermore, the browser 31 is controlled by the browser controller 141, controls the communication unit 24 as necessary, accesses a server (not shown) specified by a URL, a predetermined merchandise sales site, or the like via the network 6, and allows the display unit 30 to display the HP. When there are a plurality of processing results as a result of using the extended content metadata and one of them is to be selected, a selection display controller 142 allows the display unit 30 to display a selection screen for making a selection of the processing results.

Figure 2:
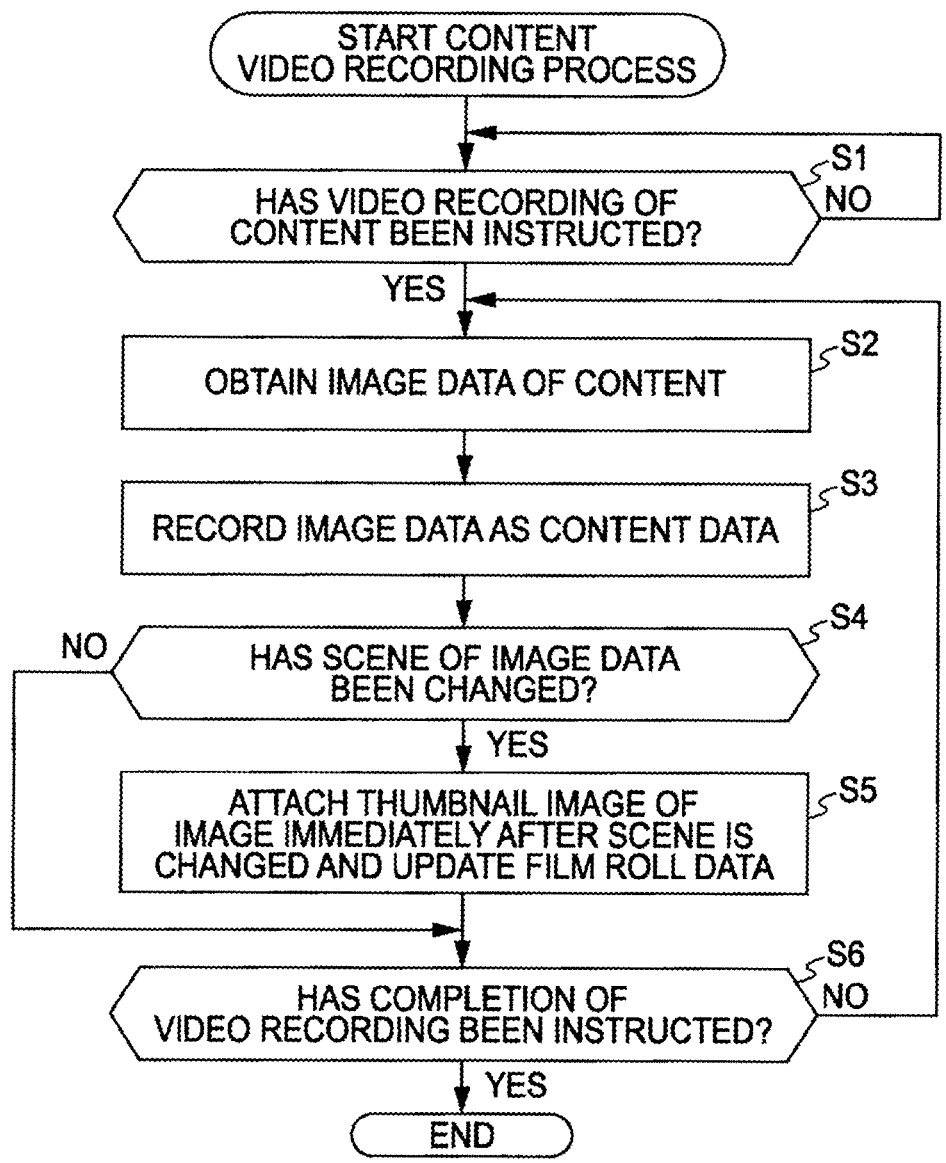
FIG. 2 is a flowchart illustrating a content recording process.

Next, a description will be given, with reference to the flowchart in FIG. 2, a content recording process.

In step S1, the content video recorder 25 determines whether or not video recording has been instructed from a signal obtained from the light-receiving unit 33, and repeats the processing until video recording is instructed. In step S1, when, for example, the operation unit 2b is operated to instruct content video recording by the user, the light-emitting unit 2a emits a corresponding signal as a light-emission signal. At this time, the light-receiving unit 33 receives the light-emission signal of the light-emitting unit 2a of the remote controller 2, and supplies a signal instructing the start of the video recording corresponding to the light-received signal to the content video recorder 25. In response, the content video recorder 25 determines that the video recording of the content has been instructed, and the process proceeds to step S2.

In step S2, the content video recorder 25 controls the tuner 23 in order to set a channel and obtains the content of the broadcast wave received by the antenna 4 at a predetermined channel. The content is not limited to content distributed in the form of a broadcast wave. For example, the content video recorder 25 also controls the communication unit 24 in order to access the predetermined program distribution server 5 via the network 6 and obtains content that is so-called network-distributed by the program distribution server 5.

In step S3, the content video recorder 25 controls the image video recorder 103 so that image data (containing audio data) of content is recorded as the content data 111 in the content data storage unit 26.

In step S4, the content video recorder 25 controls the scene change detector 101 so as to detect whether or not there is a scene change in units of frames in the obtained image data and determines whether or not a scene has been changed. More specifically, for example, when the addition result of the difference value of the pixel value between the pixels at the same position between adjacent frames is greatly changed, the scene change detector 101 detects the change of the scene.

When a scene change is detected in step S4, in step S5, the film roll data creation unit 102 converts the image of the frame immediately after a scene change has been detected into a thumbnail image, registers the thumbnail image, together with the time code at the time of reproduction, in the film roll data 112, updates the thumbnail image, and stores the thumbnail image in the content data storage unit 26. That is, in the film roll data 112, the thumbnail image of the image at the timing at which the scene change has been detected, together with the time code, is sequentially stored.

In step S6, the content video recorder 25 determines whether or not the completion of the video recording has been instructed or whether or not the distribution of the content has been completed. When the completion has not been instructed and the distribution of the content is continued, the process returns to step S2. That is, the processing of steps S2 to S6 is repeated from the timing at which the video recording of the content is instructed until the completion of the video recording is instructed or the distribution of the content is completed. Then, when the completion of the video recording is instructed or the distribution of the content is completed in step S6, the processing is completed.

As a result of the above processing, in the content data storage unit 26, the content data 111 for which video recording has been instructed and the film roll data 112 are stored.

Next, a description will be given, with reference to the flowchart in FIG. 3, of a content metadata storage process.

In step S21, the EPG obtaining unit 21 determines whether or not, for example, a predetermined period of time of approximately 24 hours has passed, and repeats the same process until the predetermined period of time has passed.

When it is determined in step S21 that, for example, a predetermined period of time has passed, in step S22, the EPG obtaining unit 21 obtains EPG data distributed in a state in which the EPG data is contained in a broadcast wave from a broadcast station (not shown), which is received via the antenna 4, and stores the EPG data as content metadata in the content metadata storage unit 22.

In step S23, the EPG obtaining unit 21 controls the communication unit 24 in order to obtain EPG data from the EPG data distribution server 3 via the network 6, and stores the EPG data as content metadata in the content metadata storage unit 22.

As a result of the above processing, the EPG data distributed in the form of a broadcast wave and the EPG data distributed via the network 6 are stored as content metadata in the content metadata storage unit 22. Basically, one of the EPG data distributed in the form of a broadcast wave and the EPG data distributed via the network 6 need only to be capable of being obtained. Therefore, in the processing of the flowchart in FIG. 3, one of the processes of steps S22 and S23 may be performed.

Next, a description will be given, with reference to the flowchart in FIG. 4, of a content reproduction process.

In step S41, the content reproduction unit 29 determines whether or not the reproduction of content has been instructed on the basis of a signal obtained by the light-receiving unit 33, and repeats the processing until the reproduction is instructed. In step S41, for example, when the operation unit 2b is operated to instruct the reproduction of the content by the user, the light-emitting unit 2a emits a corresponding signal as a light-emission signal. At this time, the light-receiving unit 33 receives the light-emission signal of the light-emitting unit 2a of the remote controller 2, and supplies a signal instructing the start of the reproduction of the content corresponding to the light-received signal to the content reproduction unit 29.

In response, the content reproduction unit 29 determines that the reproduction of the content has been instructed, and the process proceeds to step S42.

In step S42, the content reproduction unit 29 controls the image reproduction unit 131 in order to read the content data 111 corresponding to the content for which reproduction has been instructed, and allows the display unit 30 to display the content data 111 as, for example, an image-display-part search engine server 7 of FIG. 5. In FIG. 5, a window 201 is displayed, and within the window 201, an image display part 211, a film roll display part 212, a playlist display part 213, and a related information display part 214 are provided.

An image reproduction unit 131 causes an image of content recorded using the content data 111 to be reproduced in the image display part 211. At this time, the content reproduction unit 29 displays the content name of the content data 111 that is currently being reproduced in a playlist display column 213. In FIG. 5, in the playlist display column 213, "ZZZ" is displayed as the content name that is being reproduced, and "00:59:57" is displayed as a reproduction period of time.

In step S43, the film roll reproduction unit 132 reads the film roll data 112 corresponding to the content data 111 of the content that is being reproduced, and displays a film roll screen on the film roll display part 212.

In step S44, on the basis of the film roll data 112, the film roll reproduction unit 132 determines whether or not the current reproduction time is a timing at which the thumbnail image of the image after a scene is changed should be displayed. When it is a timing at which the thumbnail image should be displayed, in step S45, the thumbnail image is displayed on the film roll screen 221 of the film roll display part 212. When it is a timing at which the thumbnail image should not be displayed, the process of step S45 is skipped.

That is, as shown in FIG. 5, in the upper area in the center of the film roll display part 212, a film roll screen 221 is displayed, and thumbnail images 231-1 to 231-3 at the time of a scene change are displayed while being moved from the right to the left in the figure in synchronization with the change of the time code of the image to be reproduced. In FIG. 5, "0:18:33" and "0:18:36" are displayed as time codes at the reproduction time on the film roll screen 221. It is shown that the timing below the display time is a reproduction position of the video-recorded data corresponding to the time code, and the current reproduction position is a position indicated by the vertical straight line in the center of the film roll screen 221. Therefore, on the film roll screen 221, the thumbnail image of the scene change image is displayed at the right end in the figure at a timing immediately before the image is displayed on the image display part 211, and as the image reproduced on the image display part 211 progresses, the image moves to the left. At the timing at which the image is moved to the position of the vertical straight line in the center, the same image as the image processed as a thumbnail image is displayed in the image display part 211. Thereafter, the image moves to the left end, and before long, it disappears to the left end from the film roll screen 221.

On the film roll screen 221, it is possible to scroll the film roll screen 221 independently of the progress of the content data 111 reproduced by the image display part 211 by dragging the film roll screen 221 using a pointer or the like. At this time, when a button 222 designated as "present location" is operated, the film roll screen 221 is returned to the current reproduction position. Various kinds of operation buttons 223 shown in the lower left area in the figure enable the designation of playback start, halt, stop, fast rewinding, forward jump, or backward jump so as to operate a corresponding operation. Furthermore, when the thumbnail image 231 on the film roll screen 221 is designated, the reproduction position jumps to the reproduction position of the corresponding time code, and the playback is started.

In step S46, the content metadata extended editing unit 27 performs a content metadata editing process, extends and edits content metadata, and allows the extended content metadata storage unit 28 to store the content metadata.

Figure 6B:
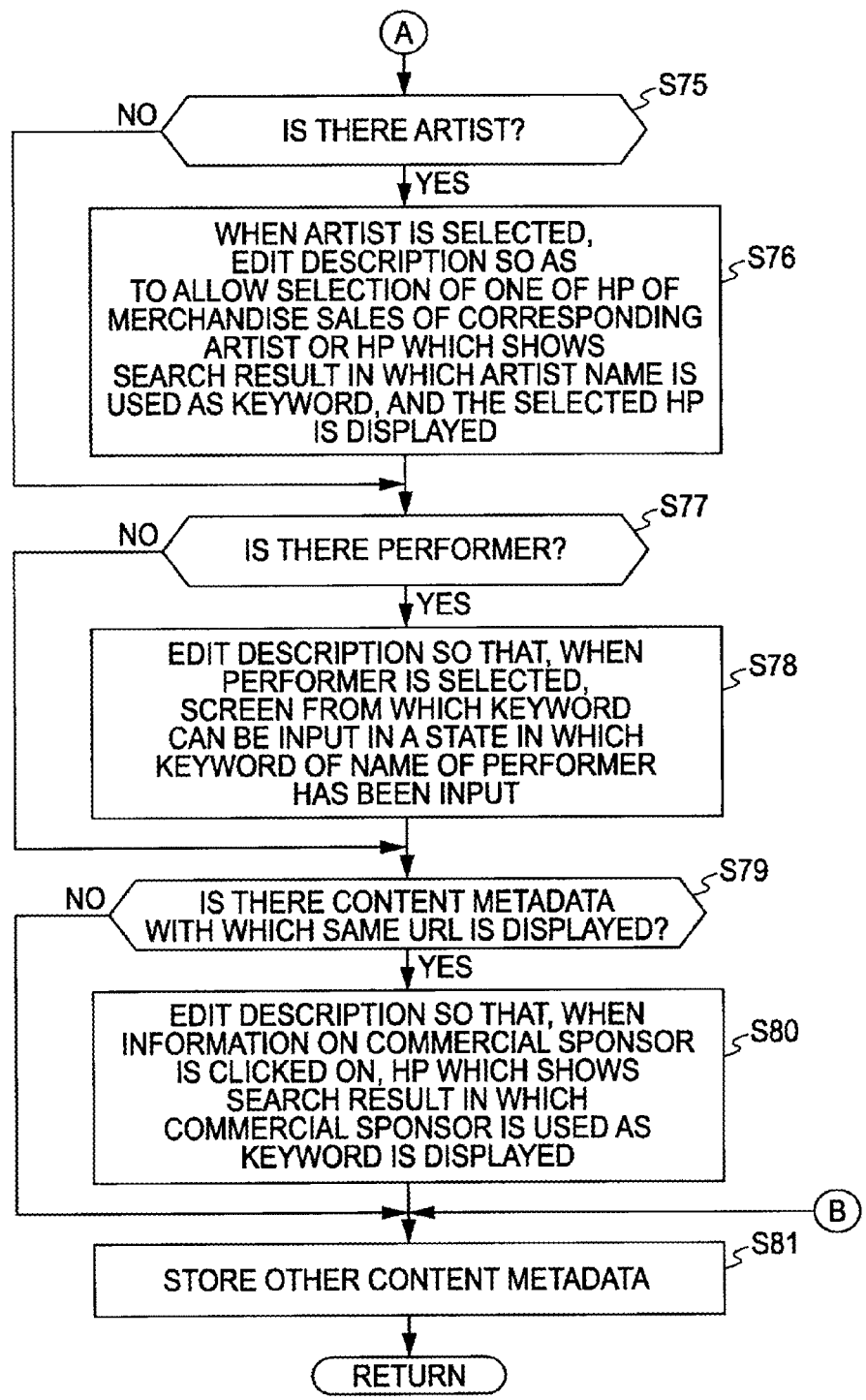
FIG. 6 is a flowchart illustrating a content metadata editing process.

A description will now be given, with reference to the flowchart in FIG. 6, of a content metadata editing process.

In step S61, the content metadata extended editing unit 27 reads content metadata corresponding to the content that is currently being reproduced from the content metadata storage unit 22.

In step S62, the category identification unit 51 determines whether or not the content that is currently being reproduced is TV (television) content, that is, whether or not the content is so-called content constituting a program.

When it is determined in step S62 that the content is, for example, TV content, in step S63, the category identification unit 51 determines whether or not content metadata belonging to the category of program titles exists on the basis of the read content metadata. When it is determined in step S63 that the content metadata belonging to the category of program titles exists, in step S64, the category identification unit 51 reads the content metadata belonging to the category of program titles and supplies the content metadata to the TV content editing unit 61. The TV content editing unit 61 controls the program title editing unit 71. When the information on a program title is, for example, selected by being clicked using a pointer or the like, the program title editing unit 71 allows the search engine server 7 to perform a search by using the text data of the content metadata belonging to the category of program titles as a keyword, edits the description of the content metadata so that an HP that shows the search result is displayed, and stores the content metadata in the extended content metadata storage unit 28.

When it is determined in step S63 that content data belonging to the category of program titles does not exist, the process of step S64 is skipped.

In step S65, the category identification unit 51 determines whether or not the content metadata belonging to the category of channels exists on the basis of the read content metadata. When it is determined in step S65 that the content metadata belonging to the category of channels exists, in step S66, the category identification unit 51 reads the content metadata belonging to the category of channels and supplies the content metadata to the TV content editing unit 61. The TV content editing unit 61 controls the channel editing unit 72. When the information on the channel is selected, for example, by being clicked using a pointer or the like, the channel editing unit 72 allows the search engine server 7 to perform a search by using the text data of the content metadata belonging to the category of channels as a keyword, edits the description of the content metadata so that an HP that shows the search result is displayed, and allows the extended content metadata storage unit 28 to store the content metadata.

As the content metadata, when the text data belonging to the category of channels represents an URL of a broadcast station of a channel, or the like, the TV content editing unit 61 may control the channel editing unit 72 in order to access the URL, and may edit metadata so that an HP of the broadcast station of the channel is displayed.

When it is determined in step S65 that the content metadata belonging to the category of channels does not exist, the process of step S66 is skipped.

In step S67, the category identification unit 51 determines whether or not content metadata belonging to the category of performers exists on the basis of the read content metadata. When it is determined in step S67 that the content metadata belonging to the category of performers exists, in step S68, the category identification unit 51 reads the content metadata belonging to the category of performers, and supplies the content metadata to the TV content editing unit 61. The TV content editing unit 61 controls the performer editing unit 73. When the information on the performers is selected, for example, by being clicked using a pointer or the like, the performer editing unit 73 allows the search engine server 7 to perform a search by using the text data of the content metadata belonging to the category of channels as a keyword, edits the description of the content metadata so that an HP that shows the search result is displayed, and allows the extended content metadata storage unit 28 to store the content metadata.

When it is determined in step S67 that the content metadata belonging to the category of performers does not exist, the process of step S68 is skipped.

On the other hand, when it is determined in step S62 that, for example, the content metadata is not TV content, for example, the content metadata is CM content, in step S69, the category identification unit 51 determines whether or not the content metadata belonging to the category of product names exists on the basis of the read content metadata. When it is determined in step S69 that the content metadata belonging to the category of product names exists, in step S70, the category identification unit 51 reads the content metadata belonging to the category of product names and supplies the content metadata to the CM content editing unit 62. The CM content editing unit 62 controls the product name editing unit 81. When the information on the product name is selected, for example, by being clicked using a pointer or the like, the product name editing unit 81 accesses a corresponding server on the basis of the URL supplied as the text data of the content metadata belonging to the category of product names, edits the description of the content metadata so that an HP that introduces products is displayed, and allows the extended content metadata storage unit 28 to store the content metadata.

When it is determined in step S69 that the content metadata belonging to the category of product names does not exist, the process of step S70 is skipped.

In step S71, the category identification unit 51 determines whether or not the content metadata belonging to the category of commercial sponsors exists on the basis of the read content metadata. When it is determined in step S71 that the content metadata belonging to the category of commercial sponsors exists, in step S72, the category identification unit 51 reads the content metadata belonging to the category of commercial sponsors, and supplies the content metadata to the CM content editing unit 62. The CM content editing unit 62 controls the commercial sponsor editing unit 82. When the information on the commercial sponsor is selected, for example, by being clicked using a pointer or the like, the CM content editing unit 62 accesses the corresponding server on the basis of the URL supplied as the text data of the content metadata belonging to the category of commercial sponsors, edits the description of the content metadata so that an HP that introduces companies that are commercial sponsors is displayed, and allows the extended content metadata storage unit 28 to store the content metadata.

When it is determined in step S71 that the content metadata belonging to the category of product names does not exist, the process of step S72 is skipped.

In step S73, the category identification unit 51 determines whether or not the content metadata belonging to the category of BGM titles exists on the basis of the read content metadata. When it is determined in step S73 that the content metadata belonging to the category of BGM titles exists, in step S74, the category identification unit 51 reads the content metadata belonging to the category of BGM titles and supplies the content metadata to the CM content editing unit 62. The CM content editing unit 62 controls the BGM title editing unit 83. When the information on the BGM title is selected, for example, by being clicked using a pointer or the like, the BGM title editing unit 83 allows the search engine server 7 to perform a search by using the text data of the content metadata belonging to the category of BGM titles as a keyword, edits the description of the content metadata so that an HP that shows the search result is displayed, and allows the extended content metadata storage unit 28 to store the content metadata.

When it is determined in step S73 that the content metadata belonging to the category of BGM titles does not exist, the process of step S74 is skipped.

In step S75, the category identification unit 51 determines whether or not the content metadata belonging to the category of artists exists on the basis of the read content metadata. When it is determined in step S75 that the content metadata belonging to the category of artists exists, in step S76, the category identification unit 51 reads the content metadata belonging to the category of artists and supplies the content metadata to the CM content editing unit 62. The CM content editing unit 62 controls the artist editing unit 84. When the information on the artist is selected, for example, by being clicked using a pointer or the like, the artist editing unit 84 displays a selection screen for accessing a merchandise sales site where CDs, DVDs, and the like of the artist are sold and displaying the corresponding HP, or for allowing the search engine server 7 to perform a search by using the content metadata belonging to the category of artists as a keyword and displaying a selection screen for selecting one of HPs that show the search result, and edits the description of the content metadata so that the HP selected on the selection screen is displayed. At this time, the selection display editing unit 63 creates the above-described selection screen, and the artist editing unit 84 edits the description of the content metadata so that the created selection screen is displayed and allows the extended content metadata storage unit 28 to store the content metadata.

When it is determined in step S75 that the content metadata belonging to the category of BGM titles does not exist, the process of step S76 is skipped.

In step S77, the category identification unit 51 determines whether or not the content metadata belonging to the category of performers exists on the basis of the read content metadata. When it is determined in step S77 that the content metadata belonging to the category of performers exists, in step S78, the category identification unit 51 reads the content metadata belonging to the category of performers and supplies the content metadata to the CM content editing unit 62. The CM content editing unit 62 controls the performer editing unit 85. When the information on the performers is selected, for example, by being clicked using a pointer or the like, the performer editing unit 85 displays a screen from which a keyword can be input in a state in which text data of the content metadata belonging to the category of performers has been input in advance, allows, when the keyword input is determined, the search engine server 7 to perform a search by using the determined keyword, edits the description of the content metadata so that an HP that shows the search result is displayed, and allows the extended content metadata storage unit 28 to store the content metadata.

When it is determined in step S77 that the content metadata belonging to the category of performers does not exist, the process of step S78 is skipped.

In step S79, the category identification unit 51 controls the same information determination unit 51a so as to determine whether or not content metadata with which the same URL is displayed exists when the content metadata is selected. When, for example, the URL of the product name is the same as the URL of the commercial sponsor in step S79, it is assumed that the same URL is possibly displayed. In step S80, the category identification unit 51 supplies the fact that the URL of the product name is the same as the URL of the commercial sponsor to the CM content editing unit 62. The CM content editing unit 62 controls the commercial sponsor editing unit 82. When the information on the commercial sponsors is selected, for example, by being clicked using a pointer or the like, the CM content editing unit 62 allows the search engine server 7 to perform a search by using the text data of the content metadata belonging to the category of commercial sponsors as a keyword, edits again the description of the content metadata so that an HP that shows the search result is displayed, and allows the extended content metadata storage unit 28 to store the content metadata. That is, the URL is displayed for the information on the product name or the commercial sponsor. Therefore, regarding the information on the commercial sponsor, the URL is not directly displayed, but the HP that shows the search result in which the text data was used as a keyword is displayed, so that, when the commercial sponsor is selected, the same information can be made not to be displayed.

When it is determined in step S79 that the content metadata with which the same URL is displayed does not exist, the process of step S80 is skipped.

In step S81, the extended editing unit 52 stores other content metadata that is not extended as it is in the extended content metadata storage unit 28. That is, when the content is a TV (television) program, the content metadata is video recording date and time, broadcast time, a genre, a subgenre, or the like. When the content is a CM (commercial message), here, since the content metadata, such as a title, is not particularly extended, the content metadata is stored as it is in the extended content metadata storage unit 28.

As a result of the above processing, since the content metadata of the content that is being reproduced is converted from simple text data to extended content metadata, when the content metadata is selected, it becomes possible to not only display the content metadata simply as text data, but also display corresponding extended related information for each category.

Here, the description returns to the flowchart in FIG. 4.

In step S47, the extended content metadata reproduction unit 133 accesses the extended content metadata storage unit 28 and determines whether or not the content metadata to be displayed exists. For example, as a result of the processing of step S46, when the extended content metadata is stored in the extended content metadata storage unit 28, it is assumed that the content metadata to be displayed exists. In step S48, the extended content metadata reproduction unit 133 reads the extended content metadata stored in the extended content metadata storage unit 28 and displays the extended content metadata on the display unit 30, as shown in the related information display part 214 in FIG. 5.

In FIG. 5, in the related information display part 214, content metadata of CM content is displayed. In the topmost area, "Tantan label (draft)" is displayed as content metadata that fits into the category of product names, indicating that the product name introduced by the CM content that is currently being reproduced is "Tantan label (draft)".

Below the product name, the content metadata that fits into the category of titles is displayed as "Tantan label (draft) picnic version", indicating that the title of the CM content is "Tantan label (draft) picnic version".

Below the title, as content metadata that fits into the category of commercial sponsors, "Karin beer" is displayed, indicating that the commercial sponsor of the CM content is "Karin beer".

Below the commercial sponsor, as content metadata that fits into the category of BGM titles, "Opening march" is displayed, indicating that the piece of music that is being broadcast as a BGM of the CM content is "Opening march".

Below the BGM title, content metadata that fits into the category of artists, "XXX (composed)" is displayed, indicating that the composer of the BGM of the CM content is "XXX".

Below the artist, as the content metadata that fits into the category of performers, "ABC", "DEF", and "GHI" are displayed, indicating that the performers for the CM content are "ABC", "DEF", and "GHI".

For these pieces of the related information, the text data of the content metadata is displayed only. When the pointer is moved to the position at which the "Tantan label", which is a product name according to the above-described extended content metadata, "Karin beer", which is a commercial sponsor, "Opening march", which is a BGM title, "XXX", which is an artist, or "ABC", "DEF", and "GHI" of the performers is displayed, and is selected by the pointer being clicked, a link display process (to be described later) causes the above-described extended link display process to be performed.

When it is determined in step S47 that the content metadata does not exist in the extended content metadata storage unit 28, the process of step S47 is skipped.

In step S49, the content reproduction unit 29 determines whether or not the stopping of the reproduction of the content has been instructed. When it is determined that the stopping of the reproduction of the content has not been instructed, the process returns to step S42. That is, as long as the reproduction is continued, the processing of steps S42 to S49 is repeated.

Then, when it is determined in step S49 that the stopping of the reproduction has been instructed, the processing is completed.

As a result of the above processing, when the reproduction of the video-recorded content is started, as shown in FIG. 5, an image shown on a window 201 including the image display part 211, the film roll display part 212, the playlist display part 213, and the related information display part 214 is continued to be displayed.

Next, a description will be given, with reference to the flowchart in FIG. 7, of a link display process.

In step S91, the link instruction detector 32 queries the content reproduction unit 29 in order to determine whether or not one of the content data 111 is currently being read and the content is being reproduced. The process is repeated until a state in which the content is being reproduced is reached. For example, in step S91, when content is being reproduced by the process described with reference to FIG. 4 described above, the process proceeds to step S92.

In step S92, the link instruction detector 32 queries the content reproduction unit 29 in order to determine whether or not the content that is currently being reproduced is TV content. For example, when the content is TV content, the process proceeds to step S93.

In step S93, the link instruction detector 32 determines whether or not the information on the program title has been selected on the basis of a signal from the light-receiving unit 33. For example, when the related information display part 214 is displayed as shown in FIG. 8, an area where "AAA" in the topmost area is displayed is selected in such a manner that the area is clicked on by the operation unit 2b of the remote controller 2 being operated, the link instruction detector 32 assumes that the information on the program title is selected, and the process proceeds to step S94.

In step S94, the link instruction detector 32 reads extended content metadata corresponding to the program title of the selected area from the content reproduction unit 29 and supplies the extended content metadata to the link display controller 34. The browser controller 141 of the link display controller 34 starts up the browser 31, controls the communication unit 24 in order to access the search engine server 7 via the network 6, allows the search engine server 7 to perform a search by using the text data "AAA" belonging to the category of program titles of the supplied extended content metadata as a keyword, and displays an HP that shows the search result on another window (not shown) differing from the window 201 of the display unit 30.

In the topmost area in FIG. 8, "AAA" is displayed as the program title, indicating that the program title is "AAA". Below the program title, the channel is displayed as "XCH BBB television", indicating that the content that is being reproduced is content broadcast by the BBB television of channel X. Below the channel, as video recording date and time information containing the video recording time, "2006/4/17 (Mon.) 21:00-22:09 (1 hour 9 minutes)" is displayed, indicating that the content is content of 1 hour 9 minutes from 21:00 to 22:09 and the date and time at which the content was recorded is Monday Apr. 17, 2006. Below the channel, as the genre, "Variety Show/Others" is displayed, indicating that the genre is "Variety Show/Others". Below the genre, as performers, "CCC", "DDD", and "EEE" are displayed, indicating that the performers are "CCC", "DDD", and "EEE".

When the program title is not selected in step S93, the process of step S94 is skipped.

In step S95, the link instruction detector 32 determines whether or not the information on the channel has been selected on the basis of the signal from the light-receiving unit 33. For example, when the related information display part 214 is displayed as shown in FIG. 8, in the case that an area where "BBB television" in the second area from the top is displayed is selected by being clicked by operating the operation unit 2b of the remote controller 2, the link instruction detector 32 assumes that the information on the channel has been selected, and the process proceeds to step S96.

In step S96, the link instruction detector 32 reads the extended content metadata corresponding to the channel of the selected area from the content reproduction unit 29 and supplies the extended content metadata to the link display controller 34. The browser controller 141 of the link display controller 34 starts up the browser 31, controls the communication unit 24 in order to access the search engine server 7 via the network 6, allows the search engine server 7 to perform a search by using the text data "BBB television" belonging to the category of channels of the supplied extended content metadata as a keyword, and displays an HP that shows the search result on another window (not shown) differing from the window 201 of the display unit 30.

When the channel is not selected in step S95, the process of step S96 is skipped.

In step S97, the link instruction detector 32 determines whether or not the information on the performers has been selected on the basis of the signal from the light-receiving unit 33. For example, when the related information display part 214 is displayed as shown in FIG. 8, in the case that an area where "DDD" among "CCC", "DDD", and "EEE" in the lowest area from the top is displayed is selected by being clicked by operating the operation unit 2b of the remote controller 2, the link instruction detector 32 assumes that the information on the performer has been selected, and the process proceeds to step S98.

In step S98, the link instruction detector 32 reads the extended content metadata corresponding to the performer in the selected area from the content reproduction unit 29 and supplies the extended content metadata to the link display controller 34. The browser controller 141 of the link display controller 34 starts up the browser 31, controls the communication unit 24 in order to access the search engine server 7 via the network 6, allows the search engine server 7 to perform a search by using the text data "DDD" belonging to the category of performers of the supplied extended content metadata as a keyword, and displays an HP that shows the search result on another window (not shown) differing from the window 201 of the display unit 30.

When the performer has not been selected in step S97, the process of step S98 is skipped.

On the other hand, when the content that is currently being reproduced is CM content, the process proceeds to step S99.

In step S99, the link instruction detector 32 determines whether or not the information on the product name has been selected on the basis of the signal from the light-receiving unit 33. For example, when the related information display part 214 is displayed as shown in FIG. 9, in the case that an area where "Lifeguard" in the topmost area is displayed is selected by being clicked by operating the operation unit 2b of the remote controller 2, the link instruction detector 32 assumes that the information on the product name has been selected, and the process proceeds to step S100.

In step S100, the link instruction detector 32 reads the extended content metadata corresponding to the product name in the selected area and supplies the extended content metadata to the link display controller 34. The browser controller 141 of the link display controller 34 starts up the browser 31, controls the communication unit 24 in order to access a server (not shown) corresponding to the URL via the network 6, and displays the HP specified by a URL on another window (not shown) differing from the window 201 on the display unit 30.

In the topmost area in FIG. 9, as the product name, "Lifeguard" is displayed, indicating that the product name is "Lifeguard". Below the product name, as a title, "Lifeguard "Financial conglomerate version"" is displayed, indicating that the title of the CM content is "Lifeguard "Financial conglomerate version"". Below the title, as a BGM title, "AAAA" is displayed, indicating that the BGM of the CM content is "AAAA". Below the BGM title, as an artist, "BBBB" is displayed, indicating that the artist is "BBBB". Below the artist, as performers, "CCCC", "DDDD", and "EEEE" are displayed, indicating that the performers are "CCCC", "DDDD", and "EEEE".

When the product name has not been selected in step S99, the process of step S100 is skipped.

In step S101, the link instruction detector 32 determines whether or not the information on the commercial sponsor has been selected on the basis of the signal from the light-receiving unit 33. For example, when the related information display part 214 has been displayed as shown in FIG. 9, in the case that an area where "Lifeguard" in the third area is displayed is selected by being clicked by operating the operation unit 2b of the remote controller 2, the link instruction detector 32 assumes that the information on the commercial sponsor has been selected, and the process proceeds to step S102.

In step S102, the link instruction detector 32 reads the extended content metadata corresponding to the commercial sponsor in the selected area from the content reproduction unit 29 and supplies the extended content metadata to the link display controller 34. The browser controller 141 of the link display controller 34 starts up the browser 31, controls the communication unit 24 in order to access a server (not shown) corresponding to the URL via the network 6, and displays the HP specified by the URL on another window (not shown) differing from the window 201 on the display unit 30, or starts up the browser 31, controls the communication unit 24 in order to access the search engine server 7 via the network 6 so that a search is performed by using the text data "Lifeguard" belonging to the category of program titles of the supplied extended content metadata as a keyword, and displays an HP that shows the search result on another window (not shown) differing from the window 201 of the display unit 30.

That is, regarding the process of step S102, a process that is set by one of the processes of steps S72 and S80 is performed depending on whether or not the URL specified in the category of product names in the content metadata matches the URL specified by the commercial sponsor.

When the commercial sponsor has not been selected in step S101, the process of step S102 is skipped.

In step S103, the link instruction detector 32 determines whether or not the information on the BGM title has been selected on the basis of the signal from the light-receiving unit 33. For example, when the related information display part 214 is displayed as shown in FIG. 9, in the case that an area where "AAAA" in the fourth area is displayed is selected by being clicked by operating the operation unit 2b of the remote controller 2, the link instruction detector 32 assumes that the information on the BGM title has been selected, and the process proceeds to step S104.

In step S104, the link instruction detector 32 reads the extended content metadata corresponding to the BGM title in the selected area from the content reproduction unit 29 and supplies the extended content metadata to the link display controller 34. The browser controller 141 of the link display controller 34 starts up the browser 31, controls the communication unit 24 in order to access the search engine server 7 via the network 6 so that a search is performed by using the text data "AAAA" belonging to the category of program titles of the supplied extended content metadata as a keyword, and displays an HP that shows the search result on another window (not shown) differing from the window 201 of the display unit 30.

When the BGM title has not been selected in step S103, the process of step S104 is skipped.

In step S105, the link instruction detector 32 determines whether or not the information on the artist has been selected on the basis of the signal from the light-receiving unit 33. For example, when the related information display part 214 has been displayed as shown in FIG. 9, in the case that an area where "BBBB" in the fifth area is displayed is selected by being clicked by operating the operation unit 2b of the remote controller 2, the link instruction detector 32 assumes that the information on the artist has been selected, and the process proceeds to step S106.

Figure 10:
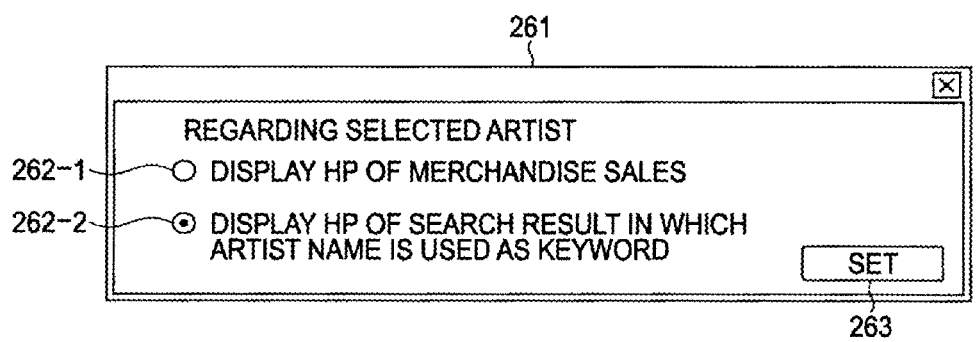
FIG. 10 illustrates an example of a selection screen.

In step S106, the link instruction detector 32 reads the extended content metadata corresponding to the artist in the selected area from the content reproduction unit 29 and supplies the extended content metadata to the link display controller 34. The selection display controller 142 of the link display controller 34 displays, for example, a selection screen shown in FIG. 10. In FIG. 10, a selection screen 261 is displayed. In the top area, "Regarding selected artist" is displayed. In the next area, "HP of merchandise sales is displayed" is displayed. In the area further below, "HP for search result in which artist name was used as keyword is displayed" is displayed. Check buttons 262-1 and 262-2 used when making a selection are provided to the left of the respective choices.

In step S107, on the basis of the signal from the light-receiving unit 33, the link instruction detector 32 determines whether or not "HP of merchandise sales is displayed" among "HP of merchandise sales is displayed" and "HP for search result in which artist name was used as keyword is displayed" has been selected. For example, when the check box 262-1 is checked and a set button 263 is operated, "HP of merchandise sales is displayed" is assumed to be selected. In step S108, the link instruction detector 32 supplies the selection result to the link display controller 34. The browser controller 141 of the link display controller 34 starts up the browser 31, and controls the communication unit 24 so that the HP for the predetermined merchandise sales site is displayed on another window (not shown) differing from the window 201 on the display unit 30 via the network 6.

On the other hand, when it is determined in step S107 that the check box 262-2 has been checked and the set button 263 has been operated, "HP for search result in which artist name was used as keyword is displayed" is assumed to be selected. In step S109, the link instruction detector 32 supplies the selection result to the link display controller 34. The browser controller 141 of the link display controller 34 starts up the browser 31, and controls the communication unit 24 in order to access the search engine server 7 via the network 6 so that a search is performed by using the text data "BBBB" belonging to the category of artist names of the supplied extended content metadata as a keyword, and displays the HP that shows the search result on another window (not shown) differing from the window 201 of the display unit 30.

In step S105, when the BGM title has not been selected, the processing of steps S106 to S109 is skipped.

In step S110, the link instruction detector 32 determines whether or not the information on the performer has been selected on the basis of the signal from the light-receiving unit 33. For example, when the related information display part 214 is displayed as shown in FIG. 9, in the case that an area where one of "CCCC", "DDDD", and "EEEE" in the lowest area, for example, "EEEE", is displayed is selected in such a manner that the operation unit 2b of the remote controller 2 is operated to be clicked, the link instruction detector 32 assumes that the information on the artist has been selected, and the process proceeds to step S111.

Figure 11:
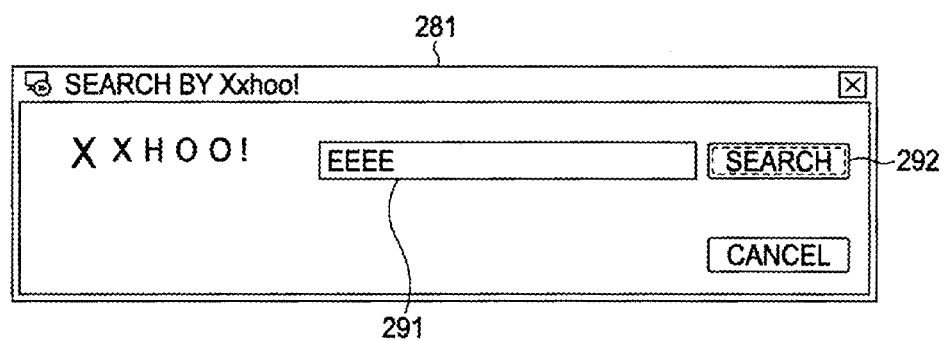
FIG. 11 illustrates an example of a keyword input screen.

In step S111, the link instruction detector 32 reads the extended content metadata corresponding to the performer in the selected area from the content reproduction unit 29 and supplies the extended content metadata to the link display controller 34. As shown in FIG. 11, the link display controller 34 displays an input screen 281 for a search keyword, in which "EEEE", which is the name of the selected performer, has been input in advance. Also, when the input of the keyword is completed and a search button 292 is operated, the browser controller 141 starts up the browser 31, controls the communication unit 24 in order to access the search engine server 7 via the network 6 so that a search is performed by using the text data "EEEE" input via the input screen 281 as a keyword, and displays an HP that shows the search result on another window (not shown) differing from the window 201 of the display unit 30.

In order to access a desired search engine server so as to perform a search by using a desired keyword, this can easily be performed by using API (Application Program Interface), which is a collection of commands and functions that are prescribed by the search engine server 7.

As a result of the above processing, not only text data of content metadata is simply displayed, but also can a search result be displayed in which a search was performed using text of content metadata by a search engine. Therefore, it is possible to extend content metadata to information to be searched for.

Information to be displayed can be changed for each category of content metadata. Furthermore, for example, by displaying the URL of the information whose URL has been set in advance and by displaying merchandise sales sites of CDs and DVDs with regard to an artist or the like, it is possible to quickly provide information having a comparatively high possibility of being demanded. In a similar manner, also, with regard to other categories, such as BGM titles and product names, a site that is most appropriate for the category, such as a merchandise sales site, may be displayed.

Furthermore, even in the case of the same keyword, by setting a selection screen for displaying a site of merchandise sales or for simply performing a search, only making a selection enables a variety of information to be quickly switched and provided.

Regarding a keyword search, for example, as shown in FIG. 11, a state of a keyword input screen is presented so that information that the user really desires to search for can be input, making it possible to provide precise information with regard to a request. Also, since a state in which a keyword has been input in advance is displayed, when related information is to be input, a minimum necessary input is performed. Therefore, it is possible to save time and effort and possible to quickly provide necessary information.

In order to perform a keyword search in a site most appropriate for each category, access is made to a search engine server different for each category, and a search may be performed by using text data input via the input screen 281 as a keyword.

Accessing a desired search engine server so as to perform a search using a keyword can be easily realized by using API (Application Program Interface), which is a collection of commands and functions, which are prescribed for each search engine server.

The above-described series of image processing can be performed by hardware and also by software. When the series of processing is to be performed by software, a program constituting the software is installed from a recording medium into a computer that is incorporated in specialized hardware, or such a program is installed from a recording medium into a general-purpose computer capable of performing various processes by installing various programs.

Figure 12:
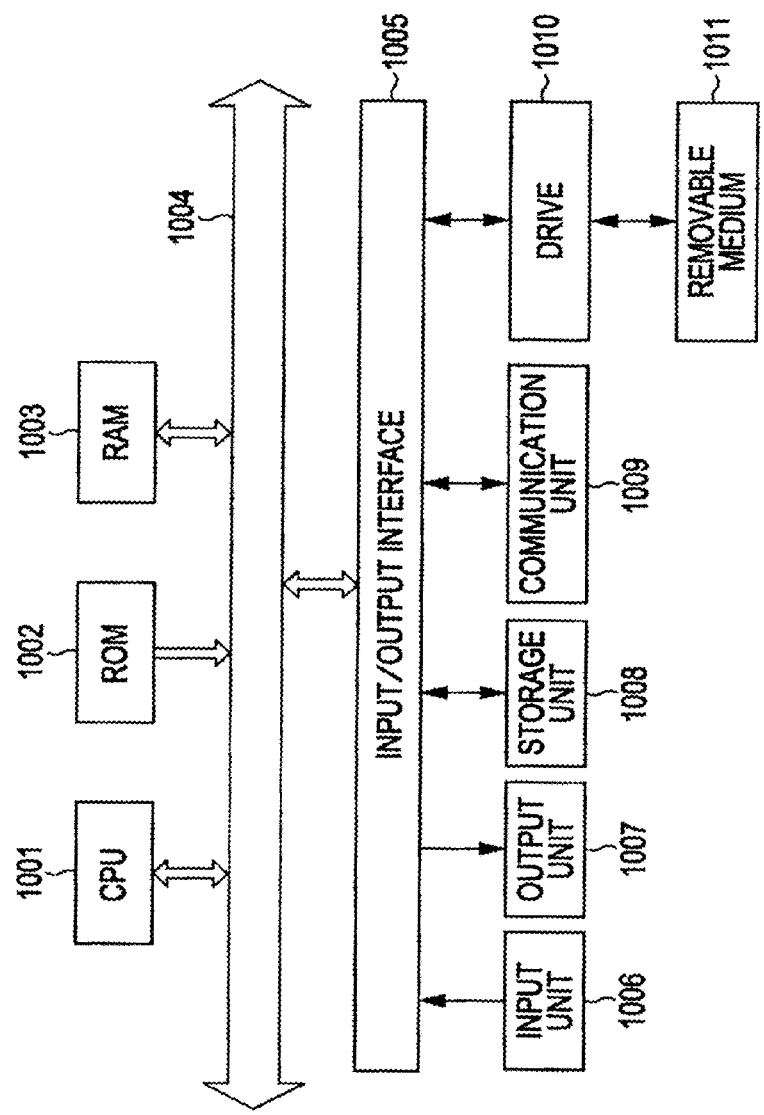
FIG. 12 illustrates an example of the configuration of a personal computer.

FIG. 12 shows an example of the configuration of a general-purpose personal computer. The personal computer incorporates a CPU (Central Processing Unit) 1001. An input/output interface 1005 is connected to the CPU 1001 via a bus 1004. A ROM (Read Only Memory) 1002 and a RAM (Random Access Memory) 1003 are connected to the bus 1004.

An input unit 1006 including input devices composed of a keyboard, a mouse, and the like, via which the user inputs an operation command; an output unit 1007 for outputting a processing operation screen and an image of a processing result to a display unit; a storage unit 1008 including a hard disk drive for storing programs and various kinds of data, and the like; and a communication unit 1009 including a LAN (Local Area Network) adaptor and the like, which performs a communication process via a network typified by the Internet, are connected to the input/output interface 1005. A drive 1010 for reading and writing data from and to a removable medium 1011, such as a magnetic disk (including a flexible disk), an optical disc (including a CD-ROM (Compact Disc-Read Only Memory) and a DVD (Digital Versatile Disc)), a magneto-optical disk (including an MD (Mini Disc)), or a semiconductor memory, is connected to the input/output interface 1005.

The CPU 1001 performs various kinds of processing in accordance with a program stored in the ROM 1002 or a program, which is read from the removable medium 1011, such as a magnetic disk, an optical disc, a magneto-optical disk, or a semiconductor memory, which is installed into the storage unit 1008, and which is loaded from the storage unit 1008 into the RAM 1003. In the RAM 1003, data necessary for the CPU 1001 to perform various kinds of processing, and the like, are also stored as appropriate.

In this specification, steps describing a program recorded on a recording medium include processes that are performed in a time-series manner according to the written order, but also processes that are performed in parallel or individually although they may not be performed in a time-series manner.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
content obtaining means for obtaining content from a source;
content metadata obtaining means for obtaining previously generated content metadata which includes text data corresponding to the obtained content;
a storage unit that stores the obtained content and the content metadata;
determination means for determining whether the obtained text data is included in a predetermined content metadata category;
editing means for editing, when the obtained text data is determined to be included in the predetermined content metadata category, the obtained content metadata to create and store extended content metadata which includes the obtained text data in association with information on a link destination corresponding to the category of the obtained text data to be displayed when a predetermined operation is performed on the text data of the obtained content metadata being reproduced, and for storing, when the obtained text data is determined to not be included in the predetermined content metadata category, the obtained content metadata in an unmodified format;
reproduction means for reproducing, at the information processing apparatus, the text data of the extended content metadata in synchronization with the reproduction of associated content; and
display means for displaying, at the information processing apparatus, the information on the link destination included in the extended content metadata created by the editing means when the predetermined operation is performed on the text data of the extended content metadata that is reproduced by the reproduction means,
wherein the determination means automatically determines whether the obtained text data read from the storage unit and corresponding to content being currently reproduced by the reproduction means and displayed on the display means is included in the predetermined content metadata category, and the editing means automatically edits the obtained content metadata corresponding to the content being currently reproduced by the reproduction means and displayed on the display means to create and store the extended content metadata.

2. The information processing apparatus according to claim 1, wherein the editing means accesses a search engine in response to the predetermined operation being performed on the obtained text data, performs a search based on the text data of the content metadata, obtains a search result containing the information on the link destination and a corresponding homepage, and edits the obtained content metadata so that the obtained information on the link destination and corresponding homepage are included in the extended content metadata and may be displayed.

3. The information processing apparatus according to claim 1, wherein the editing means accesses a sales site of a commodity related to the text data in response to the predetermined operation being performed on the obtained text data, and edits the obtained content metadata so that the sales site may be displayed.

4. The information processing apparatus according to claim 1, wherein the editing means displays, on the display means, a screen for inputting text data to be searched for by a search engine in a state in which the text data has been input in advance in response to the predetermined operation being performed on the obtained text data, accesses the search engine after the input of the text data is completed, performs a search based on the input text data, obtains a search result containing a homepage, and edits the obtained content metadata so that the homepage is included in the extended content metadata and-may be displayed.

5. The information processing apparatus according to claim 1, wherein, when the text data contains a predetermined link destination, the editing means accesses a server of the predetermined link destination in response to the predetermined operation being performed on the obtained text data, and edits the obtained content metadata so that a homepage that exists at the predetermined link destination may be displayed.

6. The information processing apparatus according to claim 1, wherein, when the text data contains a predetermined link destination, in response to the predetermined operation being performed on the obtained text data, the editing means displays a selection screen for selecting either accessing a server indicated by the predetermined link destination and displaying a homepage of the predetermined link destination or accessing a search engine and displaying a homepage that shows a search result of the text data of the content metadata, and edits the obtained content metadata so that the homepage of the selected content may be displayed.

7. An information processing method, implemented on an information processing apparatus, comprising:
obtaining content from a source;
obtaining, at the information processing apparatus, previously generated content metadata which includes text data corresponding to the obtained content;
storing, in a storage unit of the information processing apparatus, the obtained content and the content metadata;
determining whether the obtained text data is included in a predetermined content metadata category;
editing, when the obtained text data is determined to be included in the predetermined content metadata category, the obtained content metadata to create and store extended content metadata which includes the obtained text data in association with information on a link destination corresponding to the category of the obtained text data to be when a predetermined operation is performed on the text data of the obtained content metadata being reproduced, and storing, when the obtained text data is determined to not be included in the predetermined content metadata category, the obtained content metadata in an unmodified format;
reproducing, at the information processing apparatus, the text data of the extended content metadata in synchronization with the reproduction of associated content; and
displaying, at the information processing apparatus, the information on the link destination included in the extended content metadata created in the editing step when the predetermined operation is performed on the text data of the extended content metadata that is reproduced in the reproduction step,
wherein the determining includes automatically determining whether the obtained text data read from the storage unit and corresponding to content being currently reproduced and displayed is included in the predetermined content metadata category, and the editing includes automatically editing the obtained content metadata corresponding to the content being currently reproduced and displayed to create and store the extended content metadata.

8. A non-transitory computer readable storage medium for storing therein a computer program that includes instructions which when executed on an information processing apparatus including at least one processor, causes the at least one processor to execute a method comprising:
obtaining, at the information processing apparatus, content from a source;
obtaining, at the information processing apparatus, previously generated content metadata which includes text data corresponding to the obtained content;
storing, in a storage unit of the information processing apparatus, the obtained content and the content metadata;
determining whether the obtained text data is included in a predetermined content metadata category;
editing, when the obtained text data is determined to be included in the predetermined content metadata category, the obtained text data to create and store extended content metadata which includes the obtained content metadata in association with information on a link destination corresponding to the category of the obtained text data to be when a predetermined operation is performed on the text data of the obtained content metadata being reproduced, and storing, when the obtained text data is determined to not be included in the predetermined content metadata category, the obtained content metadata in an unmodified format;
reproducing, at the information processing apparatus, the text data of the extended content metadata in synchronization with the reproduction of associated content; and
displaying, at the information processing apparatus, the information on the link destination included in the extended content metadata created in the editing step when the predetermined operation is performed on the text data of the extended content metadata that is reproduced in the reproduction step,
wherein the determining includes automatically determining whether the obtained text data read from the storage unit and corresponding to content being currently reproduced and displayed is included in the predetermined content metadata category, and the editing includes automatically editing the obtained content metadata corresponding to the content being currently reproduced and displayed to create and store the extended content metadata.

9. An information processing apparatus including at least one processor comprising:

a content obtaining unit that obtains content from a source;

a content metadata obtaining unit that obtains previously generated content metadata which includes text data corresponding to the obtained content;

a storage unit that stores the obtained content and the content metadata;

a determination unit that determines whether the obtained text data is included in a predetermined content metadata category;

an editing unit that edits, when the obtained text data is determined to be included in the predetermined content metadata category by the determination unit, the obtained content metadata to create and store extended content metadata which includes the obtained text data in association with information on a link destination corresponding to the category of the obtained text data to be displayed when a predetermined operation is performed on the text data of the obtained content metadata being reproduced, and that stores, when the obtained text data is determined to not be included in the predetermined content metadata category, the obtained content metadata in an unmodified format;

a reproduction unit that reproduces, at the information processing apparatus, the text data of the extended content metadata in synchronization with the reproduction of associated content; and a display unit that displays, at the information processing apparatus, the information on the link destination included in the extended content metadata created by the editing unit when the predetermined operation is performed on the text data of the extended content metadata that is reproduced by the reproduction unit, wherein the determination unit automatically determines whether the obtained text data read from the storage unit and corresponding to content being currently reproduced by the reproduction unit and displayed on the display unit is included in the predetermined content metadata category, and the editing unit automatically edits the obtained content metadata corresponding to the content being currently reproduced by the reproduction unit and displayed on the display unit to create and store the extended content metadata, wherein the at least one processor includes the content obtaining unit, the content metadata obtaining unit, the determination unit, and the editing unit.

* * * * *